(12) United States Patent
Welz

(10) Patent No.: US 11,519,439 B2
(45) Date of Patent: Dec. 6, 2022

(54) QUICK RELEASE LOCK TURNBUCKLE

(71) Applicant: Deere & Company, Moline, IL (US)

(72) Inventor: Frank M. Welz, Beaver Dam, WI (US)

(73) Assignee: DEERE & COMPANY, Moline, IL (US)

( * ) Notice: Subject to any disclaimer, the term of this patent is extended or adjusted under 35 U.S.C. 154(b) by 1110 days.

(21) Appl. No.: 16/139,038

(22) Filed: Sep. 23, 2018

(65) Prior Publication Data
US 2020/0096029 A1 Mar. 26, 2020

(51) Int. Cl.
F16B 7/06 (2006.01)
A01D 34/82 (2006.01)
A01D 34/66 (2006.01)
A01D 101/00 (2006.01)

(52) U.S. Cl.
CPC .............. *F16B 7/06* (2013.01); *A01D 34/824* (2013.01); *A01D 34/66* (2013.01); *A01D 2101/00* (2013.01)

(58) Field of Classification Search
CPC .......... F16B 7/06; F16B 39/08; F16B 39/106; F16B 37/044; A01D 34/824; A01D 34/66; A01D 2101/00; F16G 11/12; F16G 11/02
See application file for complete search history.

(56) References Cited

U.S. PATENT DOCUMENTS

| 1,110,201 | A | * | 9/1914 | Hardick | F16G 11/12 403/44 |
| 1,265,104 | A | * | 5/1918 | Ogden | F16G 11/12 403/46 |
| 1,467,319 | A | * | 9/1923 | Hoffmann | F16G 11/12 403/44 |
| 1,711,598 | A | | 5/1929 | Hardick | |
| 2,479,096 | A | * | 8/1949 | Bratz | F16G 11/12 403/46 |
| 2,678,225 | A | * | 5/1954 | White | F16G 11/12 403/46 |
| 2,678,226 | A | | 5/1954 | White | |
| 2,845,288 | A | * | 7/1958 | Cierpik, Jr. | F16G 11/12 403/46 |
| 2,923,566 | A | * | 2/1960 | Burhop | F16G 11/12 403/56 |
| 3,081,116 | A | * | 3/1963 | Weiner | F16G 11/02 403/44 |
| 3,278,210 | A | | 10/1966 | Raymond | |
| 3,806,265 | A | | 4/1974 | Hattan | |

(Continued)

FOREIGN PATENT DOCUMENTS

| CN | 104270935 A | * | 1/2015 | ........... A01D 34/535 |
| CN | 206525063 U | * | 9/2017 | ............... H05K 7/10 |

(Continued)

*Primary Examiner* — Arpad F Kovacs

(57) ABSTRACT

A quick release lock turnbuckle includes a socket slideable axially over a turnbuckle connecting between two threaded rods at a desired end-to-end spacing. The socket has a multi-sided interior cross section engaging a multi-sided exterior cross section of the turnbuckle, and also engaging a radially extending feature on one of the threaded rods to prevent rotation of the turnbuckle in the locked position. The socket is slideable axially off the turnbuckle to allow rotation of the turnbuckle in the unlocked position to change the desired end-to-end spacing between the two threaded rods.

11 Claims, 3 Drawing Sheets

(56) References Cited

U.S. PATENT DOCUMENTS

| | | | | |
|---|---|---|---|---|
| 3,851,978 A | * | 12/1974 | Kuipers | F16B 7/06 403/45 |
| 3,989,394 A | | 11/1976 | Ellis | |
| 4,537,388 A | | 8/1985 | McCabe | |
| 4,973,185 A | | 11/1990 | Thaller | |
| 5,358,524 A | * | 10/1994 | Richelsoph | A61F 2/36 403/46 |
| 5,702,196 A | * | 12/1997 | Petercsak | F16B 7/06 403/46 |
| 5,713,686 A | * | 2/1998 | Maughan | F16B 7/06 403/46 |
| 5,730,541 A | | 3/1998 | Duett | |
| 5,822,961 A | * | 10/1998 | Busboom | A01D 34/6806 56/11.4 |
| 6,029,535 A | * | 2/2000 | Kenny | F16H 59/0278 403/349 |
| 6,343,668 B1 | * | 2/2002 | Dean | G05G 1/04 180/315 |
| 6,434,917 B1 | * | 8/2002 | Bartel | A01D 34/64 56/14.7 |
| 7,185,556 B2 | * | 3/2007 | Beattie | B62D 17/00 403/44 |
| 7,249,907 B2 | * | 7/2007 | Kay | F16G 11/12 403/53 |
| 7,458,432 B2 | | 12/2008 | Mayer et al. | |
| 7,634,953 B2 | | 12/2009 | Hoffman et al. | |
| 8,235,151 B2 | | 8/2012 | Nunez et al. | |
| 8,261,490 B2 | * | 9/2012 | Flannery | E06B 9/0615 49/55 |
| 8,353,639 B2 | * | 1/2013 | Kelly | F16B 33/002 403/46 |
| 9,682,723 B2 | | 6/2017 | Weinlader | |
| 9,695,854 B2 | * | 7/2017 | Gutta | F16B 7/06 |
| 9,746,020 B1 | * | 8/2017 | Bennett | F16B 39/12 |
| 2003/0178611 A1 | | 9/2003 | Anderson | |
| 2007/0223994 A1 | * | 9/2007 | Cohen | F16B 39/106 403/376 |
| 2011/0163210 A1 | * | 7/2011 | Hendey, Sr. | F16M 11/28 248/404 |

FOREIGN PATENT DOCUMENTS

| | | | | |
|---|---|---|---|---|
| GB | 2366507 A | * | 3/2002 | A01B 59/004 |
| KR | 200155068 Y1 | * | 8/1999 | F16B 7/06 |
| KR | 2004062490 A | * | 7/2004 | F16G 11/12 |

* cited by examiner

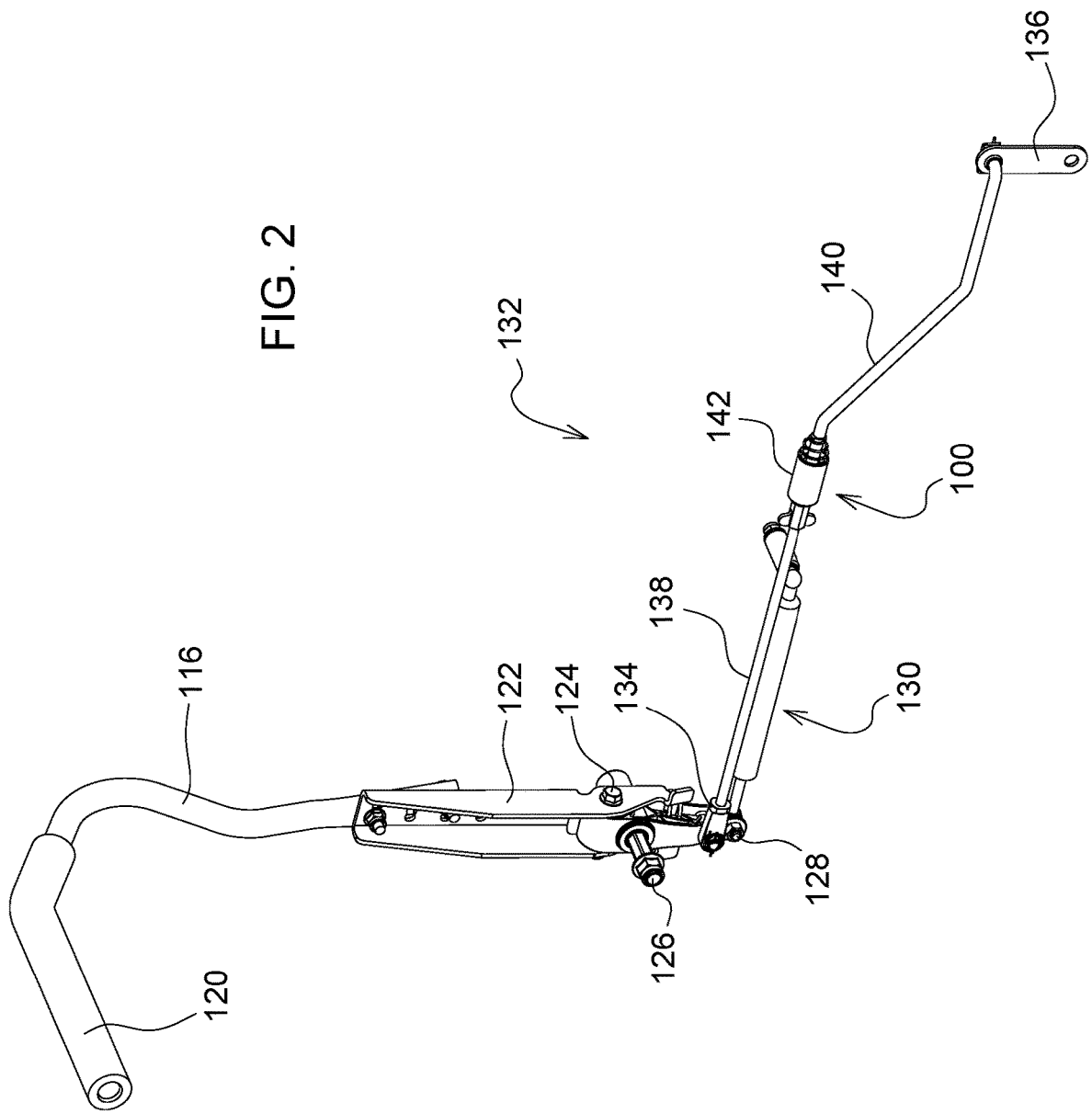

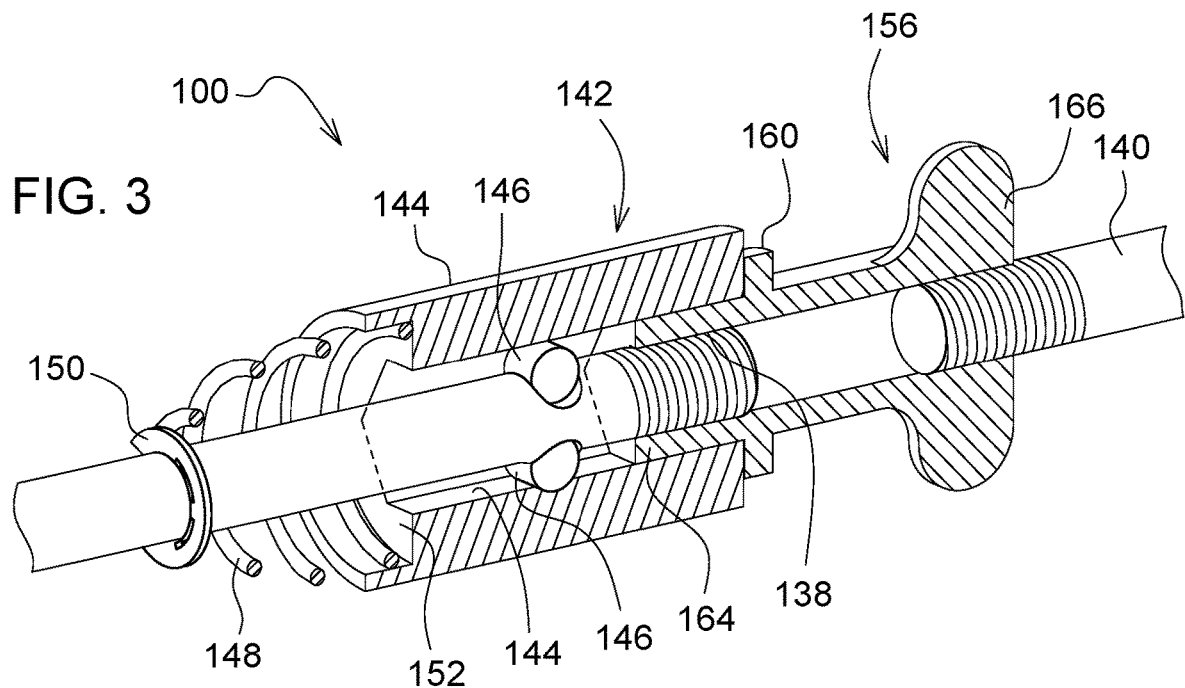
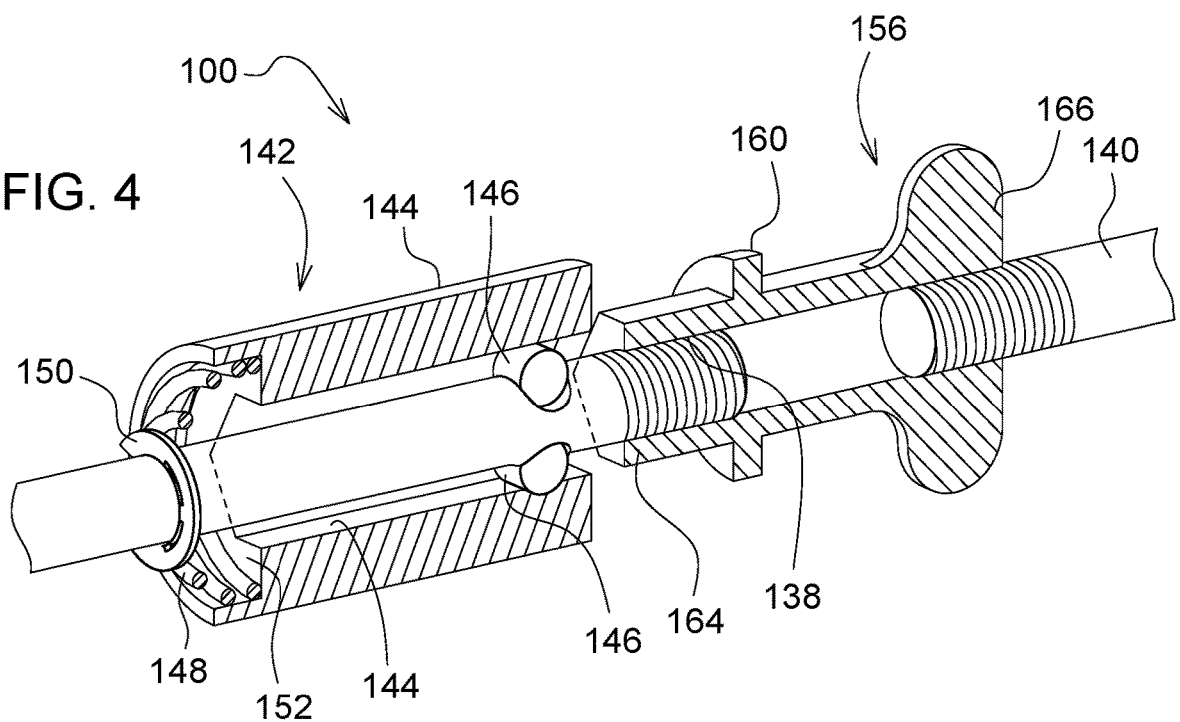

QUICK RELEASE LOCK TURNBUCKLE

FIELD OF THE INVENTION

This invention relates to a quick release lock turnbuckle, and specifically to a quick release lock turnbuckle in a steering linkage for a zero turning radius ("ZTR") mower, or for a lift linkage on a mower deck.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Typically, each control lever or stick on a ZTR mower may be linked to a pump arm of one of two separate hydraulic pumps, or of a dual hydraulic pump; i.e., a separate pump for each wheel. The lever or stick may be used to move a pump swash plate through a direct linkage.

The control levers or sticks on a ZTR mower may be mounted on the vehicle frame so that each has a first pivot axis allowing the lever or stick in the operating position to pivot forwardly in an arc to turn the wheel in forward, or pivot rearwardly to turn the wheel in reverse. Additionally, the operator can pivot each lever or stick to a neutral operating position, and then pivot each lever or stick outwardly in an arc to a non-operating or park position. If both levers or sticks are pivoted to neutral, the ZTR mower should be stationary, both levers or sticks should be at the same position, and both levers or sticks should align with slots so that they can pivot outwardly to park. An operator may need to make neutral adjustments to the linkages if the levers or sticks are misaligned in the neutral position, due to wear, age or loosening of components of the ZTR mower.

Neutral adjustments for levers or sticks on ZTR mowers typically require the operator to loosen a pair of turnbuckles. Tools are needed to loosen the jamnut on a turnbuckle, which connects the lever control arm to the pump control arm. Many existing turnbuckles include a secondary jamnut to lock the turnbuckle settings. The operator then must retighten the turnbuckles. The operator also may need to lift the rear of the unit off the ground to prevent the machine from moving during the adjustment.

Some mower decks also have lift arms with an adjustment turnbuckle that may be used to level the deck at the desired cutting height. These turnbuckles have jamnuts that must be loosened and then retightened with tools.

There is a need for a quick release lock turnbuckle for a steering linkage on a ZTR mower that does not require the operator to use tools. A quick release lock turnbuckle is needed that allows neutral adjustments to be performed with minimal effort. A quick release lock turnbuckle is needed that does not loosen during use. There also is a need for a quick release lock for a turnbuckle used in a mower deck linkage.

SUMMARY OF THE INVENTION

A quick release lock turnbuckle connects a first rod and a second rod of a zero turn mower steering linkage. The first and second rods are threaded into a first end and a second end of a turnbuckle with an outer multi-sided cross section. A socket having an internal passage with a multi-sided cross section is slideable over the turnbuckle to a locked position preventing rotation of the turnbuckle. The socket is slideable off the turnbuckle to an unlocked position allowing rotation of the turnbuckle to adjust how far the first rod and the second rod are threaded into the first end and the second end of the turnbuckle

BRIEF DESCRIPTION OF THE DRAWINGS

FIG. 2 is a perspective view of a control lever of a ZTR mower with a quick release lock turnbuckle according to a first embodiment of the invention.

FIG. 3 is a perspective view, partially in section, of a quick release lock turnbuckle in a locked position according to a first embodiment of the invention.

FIG. 4 is a perspective view, partially in section, of a quick release lock turnbuckle in an unlocked position according to a first embodiment of the invention.

DESCRIPTION OF THE PREFERRED EMBODIMENT

Figure 1:
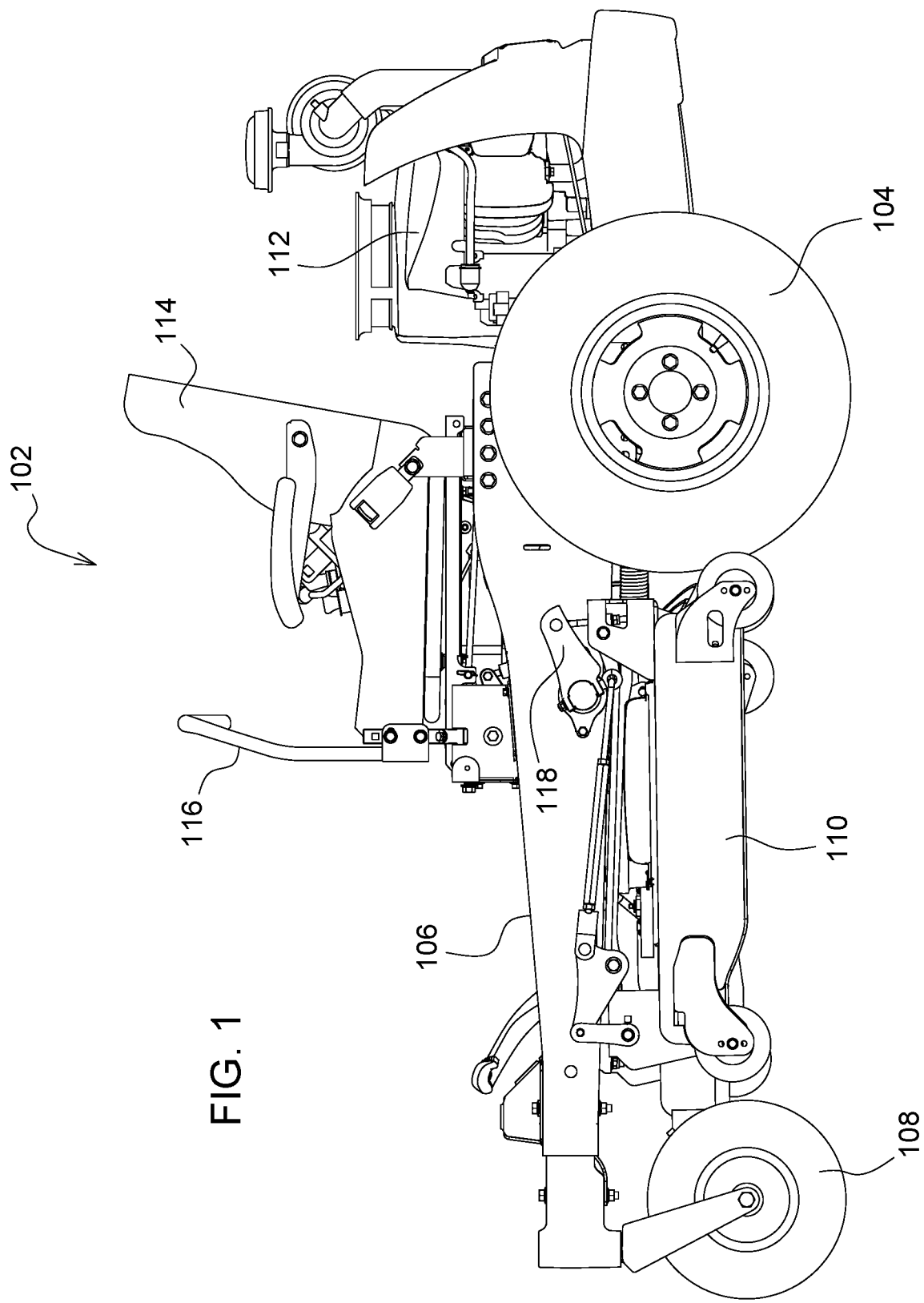
FIG. 1 is a side view of a ZTR mower with quick release lock turnbuckles according to a first embodiment of the invention.

In one embodiment, quick release lock turnbuckle 100 may be used on zero turning radius ("ZTR") mower 102 shown in FIG. 1, having at least one drive wheel 104 on each side that is independently powered to rotate independently of the other drive wheel. Each independent drive may include a separate hydrostatic drive motor coupled to each wheel. The pair of drive motors may be connected via hydraulic conduits to a dual hydrostatic pump; i.e., a separate pump for each wheel. Each side of the dual hydrostatic pump may have a swash plate that may define a pump stroke between a neutral position and a full forward position. The ZTR mower may have a frame 106 supported on a forward end by front wheels 108, and suspending a mower deck 110 between the front and rear wheels. The quick release lock turnbuckle also may be used between each lift arm 118 and the mower deck. to level the deck. The ZTR mower may have a rear-mounted engine 112 behind an operator seat 114. The seat may be mounted over the frame for a seated operator to use left and right control arms 116, here shown in the neutral position.

Now referring to FIG. 2, in one embodiment, quick release lock turnbuckle 100 may be used to adjust the neutral position of motion control lever or stick 116 used to drive a ZTR mower. Each control lever or stick may be mounted to the ZTR mower so that the lever may pivot forwardly to move a swash plate in a hydrostatic pump in a first direction to cause a drive wheel to rotate forward, or pivot rearwardly to move the swash plate in a second direction to cause the drive wheel to rotate backward. Each control lever or stick may have a neutral position in which the corresponding drive wheel is at rest. The pair of control levers or sticks may be mounted in front of operator's seat 114 on a ZTR mower.

In one embodiment, the lower end of each control lever or stick 116 may be mounted so that each lever or stick can move independently of the other. In FIG. 1, both levers or sticks are shown in the neutral position. Each control lever or stick may have a grip 120 at its first or upper end, and may be fastened with bolts to neutral position lever 122 at its second or lower end. The neutral position lever may pivot on a first axis defined by shaft or threaded fastener 124, and a second axis defined by a transverse shaft or threaded fastener 126 that is perpendicular to the first axis. Control pivot 128 may be connected to each lever of the dual lever steering controls, so that the control pivot can pivot with forward and reverse pivoting of each lever. Damper 130 and steering linkage 132 each may be separately fastened to control pivot 128 as will be explained below.

In one embodiment, quick release lock turnbuckle 100 may connect between two threaded rods 138, 140 of steering linkage 132. The quick release lock turnbuckle may connect the two threaded rods coaxially, at a desired end-to-end spacing. The quick release lock turnbuckle may be positioned between the two threaded rods, preferably at a location between the control lever and hydrostatic pump. More specifically, the quick release lock turnbuckle may be positioned between front ball joint 134 of control pivot 128 at the base of the control lever, and input lever 136 of the hydrostatic pump. The quick release lock turnbuckle may provide adjustability of the effective length of the steering linkage, and lock in the adjustment to prevent rotation during use from the specified length.

In one embodiment, quick release lock turnbuckle 100 may include socket 142. The socket may have internal passage 144 extending therethrough. The internal passage may have a hexagonal cross section. Alternatively, the internal passage may have a square cross section or octagonal cross section. First threaded rod 138 may be inserted into and extend through the internal passage. The first threaded rod may have one or more keyed features 146 that extend radially from its outer diameter. The keyed features may engage two sides of the internal passage and prevent the socket from rotating relative to the first threaded rod, while allowing the socket to move axially relative to the first threaded rod.

In one embodiment, socket 142 may slide over turnbuckle 156. First threaded rod 138 may be threaded into first end 164 of the turnbuckle, and second threaded rod 140 may be threaded into second or opposite end 166 of the turnbuckle. The first end of the turnbuckle may be inserted into internal passage 144 extending through socket 142. This is the locked position shown in FIG. 3. In the locked position, the socket may prevent or minimize any rotation of the turnbuckle during use. For example, the first end of the turnbuckle may have a hexagonal cross section that engages the internal passage which also may have a matching hexagonal cross section. The first end of the turnbuckle may have a multi-sided cross section with an even number of sides, such as a square or octagonal cross section, that engages a matching multi-sided outer cross-section of the socket. Additionally, the turnbuckle may include socket stop 160 extending radially outwardly from the outer surface adjacent the first end of the turnbuckle. The socket stop may limit how far the turnbuckle may be inserted into the socket, as the turnbuckle may abut the socket stop when it reaches the locked position.

In one embodiment, quick release lock turnbuckle 100 may include compression spring 148 biasing the socket axially into the locked position. The compression spring may be positioned between retainer clip 150 and shoulder 152 at or near a first end of the socket. When the socket engages and locks the turnbuckle, the compression spring may prevent or minimize rotation of the turnbuckle during use, by locking in the positions of the two threaded rods.

In one embodiment, as shown in FIG. 4, the operator may unlock the turnbuckle by sliding the socket off the first end of the turnbuckle. The operator then may adjust the steering link by gripping the turnbuckle, and rotating the turnbuckle clockwise or counterclockwise to increase or decrease the effective length of the steering linkage. Rotating the turnbuckle may move one or both threaded rods axially relative to the turnbuckle, and adjust how far the first rod and the second rod are threaded into the first end and the second end of the turnbuckle.

Having described the preferred embodiments, it will become apparent that various modifications can be made without departing from the scope of the invention as defined in the accompanying claims.

The invention claimed is:

1. A quick release lock turnbuckle, comprising:
a first rod and a second rod in a zero turn mower steering linkage, the first rod and the second rod threaded into a first end and a second end of a turnbuckle; the turnbuckle having an outer multi-sided cross section; and
a socket having an internal passage with a multi-sided cross section that is slideable over the turnbuckle to a locked position preventing rotation of the turnbuckle, and slideable off the turnbuckle to an unlocked position allowing rotation of the turnbuckle to adjust how far the first rod and the second rod are threaded into the first end and the second end of the turnbuckle;
a keyed feature extending radially outwardly from the first rod and engaging a first side and a second side of the internal passage while allowing the socket to move axially relative to the first rod.

2. The quick release lock turnbuckle of claim 1 further comprising a compression spring around the first rod biasing the socket to the locked position.

3. The quick release lock turnbuckle of claim 1 further comprising a stop extending radially outwardly from the turnbuckle and wherein the socket abuts the stop when it reaches the locked position.

4. A quick release lock turnbuckle, comprising:
a turnbuckle having a multi-sided exterior cross section and a pair of ends engaging a pair of rods end to end; one of the pair of rods having a radially extending feature;
a socket slideable over one of the ends of the turnbuckle and having a multi-sided internal bore engaging the radially extending feature in a locked position while allowing the socket to move axially relative to the one rod, and slideable off the end of the turnbuckle in an unlocked position.

5. The quick release lock turnbuckle of claim 4 wherein the turnbuckle has internally threaded first and second ends engaging the pair of rods.

6. The quick release lock turnbuckle of claim 4 further comprising a coil spring urging the socket to the locked position.

7. The quick release lock turnbuckle of claim 4 wherein the pair of rods are part of a zero turn mower steering linkage.

8. A quick release lock turnbuckle, comprising:
a socket slideable axially over a turnbuckle connecting between a first threaded rod and a second threaded rod at a desired end-to-end spacing; the socket having a multi-sided interior cross section engaging a multi-sided exterior cross section of the turnbuckle and engaging a radially extending feature on one of the threaded rods to prevent rotation of the turnbuckle in the locked position; the socket being slideable axially off the turnbuckle to allow rotation of the turnbuckle in the unlocked position to change the desired end-to-end spacing between the first threaded rod and the second threaded rod.

9. The quick release turnbuckle of claim 8 further comprising a spring urging the socket to the locked position.

10. The quick release lock turnbuckle of claim 8 wherein the multi-sided interior cross section and exterior cross section are hexagonal.

11. The quick release lock turnbuckle of claim 8 wherein the threaded rods are in a steering linkage of a zero turn mower.

* * * * *